Patented May 15, 1934

1,958,624

UNITED STATES PATENT OFFICE 1,958,624

LIGNIN DISPERSION AND THE PROCESS OF MAKING SAME

Guy C. Howard and Carlyle Harmon, Wausau, Wis.

No Drawing. Application July 27, 1931, Serial No. 553,383

49 Claims. (Cl. 149—4)

This invention relates to the making of improved colloidal dispersions in aqueous solution from solid phase lignin substances which dispersions are characterized by containing substantially pure lignin substance existing as a lignin-sulphonic acid compound in improved (superior) dispersion form, substantially free from non-ligneous organic impurities and containing a relatively low content of impurities in the form of inorganic salts.

These dispersion products are believed to be novel in chemical composition by reason of the specific procedures by which they are made and are useful for various purposes. For example, some of these dispersion products constitute improved tanning agents for use in making leather and others have other advantageous uses by reason of their novel chemical composition and improved dispersion form.

In principle, our dispersion products can be made from any lignin substance in solid phase form which has resulted from separating such lignin material from associated non-ligneous organic matter by precipitation or other method provided it has not been essentially altered in the process of separation as regards its normal chemical characteristics. The essential requirement is that the lignin substance shall still retain its normal property of yielding a lignin-sulphonic acid compound when properly treated with a bisulphite salt, or in other words, that it shall be a lignin substance in which the active groups normally present in lignin substance to which a sulphonic acid group can attach have not been eliminated by the process of separation of the lignin substance from associated non-ligneous organic matter. The facility with which dispersion products can be made from any such lignin material in accordance with our invention will vary to a considerable extent with the amount of sulphonic acid groups it may already contain and to some extent with its physical condition. Both of these causes of variation are determined by the manner in which the lignin substance has been separated from associated non-ligneous organic matter.

We preferably secure such lignin substance from the waste sulphite liquor resulting from the acid sulphite process of making paper pulp by cooking wood under pressure with usually an aqueous solution of calcium bisulphite and free sulphurous acid which may be referred to as a calcium base cooking acid and we accomplish the separation of the lignin substance from the non-ligneous organic matter associated with it in such waste liquor by a precipitation treatment with caustic lime in solid phase form. The cooking acids are sometimes made by using in part or entirely the so-called soluble bases as, for example, magnesium, ammonium or sodium. The resulting waste sulphite liquors from some of these soluble base cooking acids are suitable for use in securing the desired lignin substance by caustic lime precipitation while others are not well suited to such treatment. For example, the ammonia or magnesia base cooking acids will yield the desired lignin substance by caustic lime procipitation of the resulting waste sulphite liquor although in the case of magnesia the process results in an increase in the content of inorganic salts in the final dispersion products which is undesirable for some uses. The waste sulphite liquor from a soda base cooking acid is not suited to secure the lignin substance by a caustic lime precipitation since such substance does not readily separate from its associated non-ligneous organic matter by such precipitation treatment.

To avoid having an unnecessary amount of calcium monosulphite associated with the desired lignin substance and to secure such lignin substance in a form which lends itself most readily to treatment by our improved process, we prefer to conduct the caustic lime precipitation treatment of waste sulphite liquor in accord with the fractional precipitation procedures of Howard U. S. Patent Reissue No. 18,268 dated December 1, 1931, or Howard U. S. Patent No. 1,856,558 dated May 3, 1932, whereby calcium mono-sulphite can be precipitated and removed from the waste sulphite liquor prior to the precipitation of the lignin substance and by which procedure the lignin substance is in advantageous physical form and chemical composition for treatment by our improved process.

The lignin substance as thus precipitated from waste sulphite liquor by caustic lime treatment is substantially free from the non-ligneous organic substances previously associated with it and is in a flocculated but not firmly aggregated condition. It is alkaline and contains organically combined sulphur. Evidently it exists largely as a basic calcium lignin-sulphonic acid compound, containing more calcium base than required to form a salt with the sulphonic acid group and part of the surplus calcium is believed to be attached to some weak acid group in the lignin to yield the basic salt under these alkaline conditions and some of the surplus calcium is undoubtedly present as free caustic lime.

Furthermore, it is disclosed in Howard's U. S.

Patent No. 1,848,292 dated March 8, 1932, that when such precipitated lignin substance is given a steam pressure cook in the presence of caustic lime, a reduction in the amount of organically combined sulphur in such lignin substance results and probably more or less alteration or rearrangement of the lignin in other respects takes place, also that the lignin is in a materially more firmly aggregated physical form. In view of this and other considerations, it is believed that even when precipitating lignin substance from waste sulphite liquor by a caustic lime treatment at atmospheric pressure or below and at not exceeding 100° C., the organically combined sulphur content of such precipitated lignin substance has been somewhat reduced (through splitting off as calcium mono-sulphite under the caustic lime alkalinity) below the amount of organically combined sulphur (in sulphonic acid form) believed to be necessary to effect complete dispersion of the lignin substance. When using such precipitated lignin substance and a suitable lignin substance secured by other means of separation from associated non-ligneous organic matter, it is considered necessary to establish and maintain a certain content of organically combined sulphur before complete dispersion of the lignin substance can be accomplished to yield our improved dispersion products.

We have found as a result of our extensive investigations in the making of lignin products for use both as tanning agents and as various salt forms of lignin substance:

(1) That it is desirable the lignin substance be substantially freed from associated non-ligneous organic matter and that such purified lignin substance can advantageously be secured from waste sulphite liquor by treatments which involve precipitation of the lignin substance with caustic lime;

(2) That since lignin substance is colloidal in character and of relatively large molecular units it is difficult to completely disperse or solubilize solid phase lignin substance and the procedures of our improved process are advantageous methods of accomplishing the necessary dispersion to yield our improved final products. Inorganic materials, in general, are normally either completely soluble to form true solutions or are insoluble, but in dealing with colloidal material such as lignin substance the conditions are radically different and it is necessary to deal with various degrees of solubility or in other words, degrees of dispersion or peptization. It is unlikely that lignin substances—even in their complete sulphonic acid forms—yield true solutions (as crystalline inorganic compounds do) but the sulphonic group (.SO₃H) attached to lignin tends to solubilize or disperse it and when a sufficient amount of sulphonic groups have been attached the lignin substance can be effectively dispersed to approach but never wholly reach a condition of true solution;

(3) That a lignin substance may be apparently dissolved as judged, for example, by its allowing of the settling out therefrom of inorganic solids such as calcium carbonate or calcium mono-sulphite, more or less completely, but such apparent solution we find is radically different in its degree of dispersion from the same lignin substance when more completely dispersed by our improved procedures as judged for example, by the greater facility with which such dispersions will filter through a tight mesh filtering medium.

The necessity of obtaining maximum dispersion of the lignin substance in making our desired lignin-sulphonic acid salt products is that chemical reactions, such for example, as double decomposition reactions, in incompletely dispersed solutions are sluggish and incomplete, hence do not yield products which are identical with those gotten from more completely dispersed lignin substances. Furthermore, it is necessary and advantageous to get final products in fully dispersed form, because for example, a lignin tanning product if incompletely dispersed cannot properly penetrate into the hide in the tanning operation;

(4) That subjecting suitable lignin substance, which has been previously separated from associated non-ligneous material, to suitably prolonged treatment with a heated solution containing a suitable bisulphite salt, for example, calcium bisulphite, at a pH value below 6.0 is the most effective method of accomplishing this desired maximum degree of dispersion in making our improved products. Such treatment evidently functions primarily through providing the necessary amount of sulphur organically combined in the lignin substance presumably by attachment of sulphonic groups (.SO₃H) and perhaps secondarily through the bisulphite under such pH conditions acting as a specific dispersing agent for the resulting lignin compound. The extent of the treatment necessary will vary with the amount of organically combined sulphur to be provided and the physical condition of the lignin substance;

(5) That it is desirable to produce final products with a practical minimum content of inorganic impurities and this can best be accomplished by dispersing the lignin substance in the form of its calcium lignin-sulphonic acid salt and subsequently removing the inorganic calcium salts present in the system by means of suitable acid reagents, for example, sulphuric acid;

(6) That when the final product is to contain an organically combined base other than calcium it is also desirable to accomplish the dispersion of the lignin substance in the form of its calcium lignin-sulphonic acid salt and subsequently convert some or all of it to a salt of the selected base by a double decomposition reaction;

(7) That lignin substance in such condition of maximum dispersion is sensitive to injury as regards its degree of dispersion by improper treatment with concentrated mineral acids, for example, sulphuric acid, and that it is essential to add such acid reagents in suitably diluted form to preferably cold dispersions and with effective stirring during such additions;

(8) That such desired dispersions are subject to injury as regards degree of dispersion and actual composition if heated under improper conditions, for example, in the substantial absence of bi-sulphite, and that in general the lower the pH conditions the more sensitive such lignin dispersions are to injury.

The following description embodies the essential steps and preferred procedures of our process for accomplishing the purposes of this invention. This is described with particular reference to the making of products for use in tanning leather but the deviations are indicated for making products to be used for other purposes. It assumes the use of our preferred solid phase lignin substance gotten in the manner previously referred to by precipitating lignin substance from calcium base waste sulphite liquor with a caustic lime treatment to substantially separate it from associated non-ligneous organic matter. When other suitable lignin substance is used, as gotten by different methods of separation from associated non-ligneous material, the procedures of our process are essentially the same, but the facility with which the lignin substance responds to the treatment will vary.

Step (1)

The aforesaid solid phase lignin substance, after having been obtained substantially free of non-ligneous organic matter by a caustic lime precipitation, and after having been washed, if desired, with water made strongly alkaline with caustic lime to remove any residual mother liquor impurities, is dissolved by heating for sufficient time, preferably with stirring, in a solution of a suitable alkali earth bisulphite, preferably calcium bisulphite, to yield a desired aqueous solution dispersion containing an alkali earth salt of lignin-sulphonic acid, an excess of alkali earth bisulphite, and minor soluble constituents together with normally an inorganic precipitate of an alkali earth mono-sulphite salt. Incidentally, any magnesium hydroxide which may have been associated with the lignin substance will exist in this solution as a magnesium salt.

We preferably accomplish this step by treating the wet solid lignin substance with sulphur dioxide, ($SO_2$), preferably $SO_2$ resulting in part or entirely from subsequent steps in the process as will be described, whereby calcium bisulphite is formed by reaction with the available lime and/or the calcium mono-sulphite associated with this lignin substance, to reduce the pH value from around 12.0 for this wet basic lignin substance to normally pH 4.0–5.0 for the resulting solution as representing an equilibrium pH value for a calcium bisulphite and calcium lignin-sulphonic acid solution in contact with the solid phase calcium mono-sulphite normally present. The solution is then heated in the presence of substantial amounts of calcium bisulphite at a temperature preferably from 70°–90° C. to completely disperse the lignin substance and this aforesaid lignin substance may ordinarily with proper stirring be fully dispersed in one hour by such procedure at the temperatures mentioned. In the case of lignin substances derived from other sources (especially such as contain smaller amounts of organically combined sulphur it is sometimes necessary to heat in the presence of bisulphite to higher temperatures and for longer periods depending on the physical condition and actual composition of the lignin material in order to accomplish the desired degree of dispersion. It is permissible to have free sulphurous acid in the solution but in this case solid phase calcium mono-sulphite can not be present as it would be converted into calcium bisulphite. It is, however, the presence of bisulphite in substantial amounts that is considered essential to accomplishing the desired results.

Step (2)

Remove the normally present precipitate of calcium mono-sulphite from the resulting solution as by sedimentation or other suitable means and if desired the solution may be concentrated by evaporation which incidentally induces escape of sulphur dioxide gas from the calcium bisulphite and thereby increases the amount of calcium mono-sulphite removable.

Since provisions are made to remove and recover sulphur dioxide gas evolved during the process, it is permissible to omit this step of removing any solid phase calcium mono-sulphite and allow it to remain in the system and be subsequently decomposed along with the calcium bisulphite component as will be described later.

Step (3)

Preferably cool the resulting solution to around 40° C. or below prior to the treatment in the next step. This is advisable and normally done to permit of adding the necessary acid reagent, for example sulphuric acid, with a minimum of injurious effects.

Step (4)

To the resulting solution add a suitable acid reagent, preferably dilute sulphuric acid ($H_2SO_4$), in sufficient equimolecular amount to decompose the inorganic bisulphite and mono-sulphite salts present in the system as shown by analysis into free sulphurous acid and an insoluble calcium salt, for example calcium sulphate, and to leave enough base in the solution to form a salt with all the lignin-sulphonic acid component. The sulphuric acid should preferably be diluted to 25% strength or weaker and added very cautiously with efficient mixing.

The purpose of this step is to decompose the bisulphite and mono-sulphite salts remaining in the system after the dispersion has been accomplished and to leave the lignin-sulphonic acid compound in its salt form with a minimum amount of inorganic salts as impurities.

When dispersions of lignin-sulphonic acid compounds in their salt forms are the final products being made the above specified equimolecular amount of sulphuric acid reagent is added, but when certain tanning products are being made in which it is desired to have part of the lignin-sulphonic acid compound in its free acid form and the remaining part in its salt form, we add a sufficient additional amount of the acid reagent, for example, sulphuric acid, to accomplish this desired purpose, such for example, as to yield an equilibrium mixture of free lignin-sulphonic acid and its calcium salt represented by a pH value of preferably between 3.0 and 4.0 which we have found to be the range of pH value for a final product best suited for most, but not all, uses as a tanning agent. The acid reagent must, of course, be a stronger acid than the lignin-sulphonic acid to accomplish this result, but we find that sulphuric acid for example, is a strong enough acid for such purpose our analysis of the final product after removal of substantially all the free sulphurous acid which may be present indicates that at pH 3.0 it contains appreciable amounts of free lignin-sulphonic acid, while at pH 4.0 such free acid is not present.

For the purpose of the present invention which is primarily to make improved dispersion products in which all or the major portion of the lignin-sulphonic acid compound is in its salt form and a minor portion only in its free acid form, we preferably do not add enough of this sulphuric acid reagent to convert all the lignin-sulphonic acid compound into its free acid form even though such free acid will react with oxides or carbonates of bases to yield salts. Such last mentioned procedure, that is, the use of sufficient sulphuric acid reagent to convert all the lignin-sulphonic acid compound into free acid form and the formation of salts of lignin-sulphonic acid by adding to such free acid oxides or carbonates of bases, is equivalent in principle to the steps 4 and 6 of the process as herein described, but is disadvantageous in that it tends to yield somewhat inferior dispersion products due to the free lignin-sulphonic acid being more sensitive than its salts to injury as regards degree of dispersion. It is, therefore, preferable to maintain the salt forms insofar as it is practical and utilize the double decomposition reaction with a selected salt as described in step 6 rather than adding a controlled amount of an oxide or carbonate to a free lignin-sulphonic acid.

*Step (5)*

The resulting insoluble calcium salt, for example, calcium sulphate, may be removed by sedimentation or other suitable means prior to proceeding with the process and this will usually be accomplished to more or less extent as bottoms or sludge products in a normal procedure of carrying out the process, but this is not necessary as this precipitate may carry through and be removed subsequently.

*Step (6)*

Convert some or all of the calcium salt of lignin-sulphonic acid present in the resulting solution into the corresponding salt of such base or bases as may be selected for the final product and throw out the calcium as an inorganic precipitate. This is accomplished by double decomposition reaction through adding a soluble salt of such selected base or bases with an acid whose calcium salt is sufficiently insoluble as for example, the sulphates of magnesia, ammonia, copper, zinc, aluminum, chromium and so forth, or the basic sulphates of chromium or aluminum, or in principle, the oxalates or phosphates of suitable bases.

A concentrated solution of the selected salt is added to the solution in preferably a slight excess over the necessary equimolecular amount and the solution is preferably heated either before or after the addition of this salt whereby substantially all of the calcium is thrown out as an inorganic precipitate, for example, as calcium sulphate, and a corresponding soluble lignin-sulphonic acid salt of the selected base is produced.

*Step (7)*

Allow sufficient time for such insoluble calcium salt to completely form because of retarded precipitation in a (normally concentrated) solution of this colloidal character and separate this inorganic precipitate from the preferably hot solution by sedimentation or other suitable means.

*Step (8)*

Remove substantially all the free sulphurous acid or such portion thereof as may be desired from the resulting solution by suitable means to yield improved colloidal dispersion of lignin substance in aqueous solution and if desired make a minor adjustment of the pH value of such product. Such free sulphurous acid may be removed for example by evaporation preferably at reduced pressure and a temperature below 100° C., but since such dispersions are injuriously affected by prolonged heating in the absence of free sulphurous acid (or bisulphites) especially when free lignin-sulphonic acid is present this evaporation should be carried out cautiously.

*Step (9)*

Remove and recover the sulphur dioxide gas evolved during the process and utilize such recovered gas preferably in making the calcium bisulphite normally used in the process.

The resulting products of the process are improved colloidal dispersions in aqueous solution of lignin-sulphonic acid compounds in the form of either a selected salt or salts of such lignin-sulphonic acid or an equilibrium mixture, as determined by its pH value, of such free lignin-sulphonic acid and a selected salt or salts thereof. Such dispersions contain a practical minimum content of non-ligneous organic substances and they may be made by the steps described substantially free from inorganic compounds of calcium and other bases. As usually made, they are in relatively concentrated form and are of controllable pH value since they are not injured by changes of such value over relatively wide ranges.

The lignin tanning products made by this improved process act like true tanning agents in that they fix to hide substance to yield commercial quality leather and under conditions of commercial tanning substantially all of the lignin substance so fixes to hide, hence they constitute a concentrated tanning product with practically no non-tan constituents. They can be used alone or in combination with natural vegetable tans or with chrome tans or on chrome pretanned hides. For use alone the chromium base product is preferred and for use in combination with natural vegetable tans or in combination with chrome tanning agents we preferably use the magnesia base product. They improve the color of the resulting leather, reduce the tanning time, decrease the rate of hydrolysis of the hide, aid in dispersion of natural vegetable tans, provide an acid reserve without the presence of free mineral acids, permit control of the inorganic salts content in the tanning liquors, and so forth.

In uses other than for tanning purposes, the merit and utility of the products of our process result from their improved dispersion condition and higher purity through relative freedom from useless or objectionable constituents, for example, for use as mordants, as dispersing agents, as wood preservatives and fillers, as insecticides and germicides, and as intermediate raw materials for further treatments.

(Determination of the pH value of these lignin dispersions throughout the process and on the final products is found impractical in their normally concentrated condition and the pH values herein recorded were taken by diluting the concentrated solution 1:10 with distilled water and reading the pH value electrometrically by means of antimony: calomel electrodes.)

We claim:

1. The process of making an aqueous dispersion of lignin substance in lignin-sulphonic acid form which comprises treating suitable solid phase lignin substance substantially free from associated non-ligneous organic matter with an aqueous solution containing a bisulphite salt in sufficient amount and for a suitable time at a pH condition below 6.0 to disperse such solid phase lignin substance, adding a suitable acid in sufficient equimolecular amount to decompose any residual inorganic sulphite salts present in the system into sulphur dioxide and a salt of such acid and expelling practically all of the sulphur dioxide from the solution to yield an aqueous dispersion containing a salt of lignin-sulphonic acid substantially free from non-ligneous organic matter.

2. The process of making an aqueous dispersion of lignin substance in lignin-sulphonic acid form which comprises treating solid phase lignin substance substantially free from associated non-ligneous organic matter with an aqueous solution containing a suuitable alkali-earth bisulphite in sufficient amount and for a suitable time at a pH condition below 6.0 to disperse such solid phase lignin substance, adding a suitable acid in sufficient equimolecular amount to decompose any residual alkali-earth sulphite salts present in the system into sulphur dioxide and to form an insoluble salt of the alkali-earth base, expelling practically all sulphur dioxide and removing the precipitated salt of alkali-earth base from the solution to yield an aqueous dispersion containing a salt of lignin-sulphonic acid substantially free from non-ligneous organic matter and inorganic salts.

3. The process of claim 1, in which the bisulphite salt is calcium bisulphite and the subsequently added acid reagent is sulphuric acid, whereby calcium sulphate is precipitated, and in which such precipitated matter is removed from the system to yield an aqueous dispersion of a salt of lignin-sulphonic acid substantially free from non-ligneous organic matter and inorganic salts.

4. The process of claim 2 in which subsequent to the addition of the acid reagent there is added a solution of a suitable salt which yields by double decomposition reaction a solution of a lignin-sulphonic acid salt of the base of such salt and an inorganic precipitate, and in separating such precipitate from the solution.

5. The process of claim 2 in which subsequent to the addition of the acid reagent there is added a solution of a sulphate of a base which yields by double decomposition reaction a solution of a lignin-sulphonic acid salt of such base and an inorganic precipitate, and in separating such precipitate from the solution.

6. The process of claim 1 in which the amount of the acid reagent added is in a controlled excess over the equimolecular amount required to decompose the inorganic sulphite salts present in the system whereby the final aqueous dispersion product contains a mixture of free lignin-sulphonic acid and a salt of lignin-sulphonic acid.

7. The process of claim 1 in which the sulphur dioxide evolved during the process is used as a reagent in the preparation of bisulphite salt reagent, which last named reagent is used in the treatment of additional solid phase lignin substance.

8. The process of making an aqueous dispersion of lignin substance in lignin-sulphonic acid form which comprises precipitating solid phase lignin substance substantially free from non-ligneous organic matter from waste sulphite liquor by treatment with a suitable alkali-earth hydroxide, separating solids from liquid, treating such solid phase lignin substance with an aqueous solution containing a bisulphite salt in sufficient amount and for a suitable time at a pH condition below 6.0 to disperse such solid phase lignin substance, adding a suitable acid in sufficient equimolecular amount to decompose any residual inorganic sulphite salts present in the system into sulphur dioxide and a salt of such acid and expelling practically all of the sulphur dioxide from the solution to yield an aqueous dispersion containing a salt of lignin-sulphonic acid substantially free from non-ligneous organic matter.

9. The process of claim 8, in which the alkali-earth hydroxide reagent is calcium hydroxide.

10. The process of claim 8 in which the bisulphite salt is an alkali-earth bisulphite which is reacted upon by the subsequently added acid reagent to form an insoluble salt of such alkali-earth base which is precipitated, and in which such precipitated matter is removed from the system to yield an aqueous dispersion of a salt of lignin-sulphonic acid substantially free from non-ligneous organic matter and inorganic salts.

11. The process of claim 8 in which the bisulphite salt is calcium bisulphite and the subsequently added acid reagent is sulphuric acid, whereby calcium sulphate is precipitated, and in which such precipitated matter is removed from the system to yield an aqueous dispersion of a salt of lignin-sulphonic acid substantially free from non-ligneous organic matter and inorganic salts.

12. The process of claim 8 in which subsequent to the addition of the acid reagent there is added a solution of a suitable salt which yields by double decomposition reaction a solution of a lignin-sulphonic acid salt of the base of such salt and an inorganic precipitate, and in separating such precipitate from the solution.

13. The process of claim 8 in which subsequent to the addition of the acid reagent there is added a solution of a sulphate of a base which yields by double decomposition reaction a solution of a lignin-sulphonic acid salt of such base and an inorganic precipitate, and in separating such precipitate from the solution.

14. The process of claim 8 in which the amount of the acid reagent added is in a controlled excess over the equimolecular amount required to decompose the inorganic sulphite salts present in the system whereby the final aqueous dispersion product contains a mixture of free lignin-sulphonic acid and a salt of lignin-sulphonic acid.

15. The process of claim 8 in which the sulphur dioxide evolved during the process is utilized as a reagent in the preparation of bisulphite salt reagent required by the process in the treatment of additional solid phase lignin substance.

16. The process of claim 8 in which the pH value of the aqueous dispersion product is of the order 3.0 to 4.0.

17. The process of claim 1 in which the solid phase lignin substance substantially free from associated non-ligneous organic matter is material which has been precipitated from a solution by any suitable means.

18. The process of claim 2 in which subsequent to the addition of the acid reagent there is added a solution of a sulphate of chromium which yields by double decomposition reaction a solution of a lignin-sulphonic acid salt of chromium and a precipitated sulphate of the alkaline-earth base, and in separating such precipitate from the solution.

19. The process of claim 2 in which subsequent to the addition of the acid reagent there is added a solution of a sulphate of magnesium which yields by double decomposition reaction a solution of a lignin-sulphonic acid salt of magnesium and a precipitated sulphate of the alkaline-earth base, and in separating such precipitate from the solution.

20. The process of claim 8 in which subsequent to the addition of the acid reagent there is added a solution of a sulphate of chromium which yields by double decomposition reaction a solution of a lignin-sulphonic acid salt of chromium and a precipitated sulphate of the base of the salt of the acid reagent, and in separating such precipitate from the solution.

21. The process of claim 8 in which subsequent to the addition of the acid reagent there is added a solution of a sulphate of magnesium which yields by double decomposition reaction a solution of a lignin-sulphonic acid salt of magnesium and a precipitated sulphate of the base of the bisulphite salt reagent, and in separating such precipitate from the solution.

22. The process of claim 1 in which the amount of the acid reagent added is in substantially exact equimolecular amount to decompose the inorganic sulphite salts present in the system.

23. The process of claim 8 in which the amount of the acid reagent added is in substantially exact equi-molecular amount to decompose the inorganic sulphite salts present in the system.

24. The process of claim 8 in which the bisulphite solution is formed by treating the wet lignin precipitate with sulphur dioxide.

25. The process of claim 8 in which the solution of bisulphite is heated to a temperature of approximately 70° to 90° C.

26. The process of making aqueous dispersions of lignin substance which comprises treating solid lignin substance in lignin-sulphonic acid form and substantially free from non-ligneous organic matter with calcium bisulphite in presence of water and absence of non-ligneous organic matter.

27. The process of claim 26 in which a suitable acid is used to decompose substantially all of the calcium monosulphite and bisulphite salts present in the dispersion and thereupon separating the resulting precipitate from the dispersion.

28. The process of claim 26 in which the solid lignin substance treated contains calcium monosulphite.

29. The process of claim 26 in which the solid lignin substance treated contains calcium hydroxide.

30. A process of making aqueous dispersions of lignin substance which comprises treating solid lignin substance in lignin-sulphonic acid form admixed with calcium monosulphite and substantially free from non-ligneous organic matter with sulphur dioxide in presence of water until the lignin substance is thoroughly dispersed, treating the dispersion with a suitable acid to precipitate a calcium salt, and to liberate sulphur dioxide, and driving off sulphur dioxide from the dispersion and utilizing such sulphur dioxide for treating in a cyclic system fresh quantities of material as hereinbefore specified.

31. The process of making an aqueous dispersion of lignin substance which comprises precipitating a salt of lignin-sulphonic acid from waste sulphite liquor by means of caustic lime, separating such precipitate from the residual liquor and reacting thereon with a solution of calcium bisulphite until completely dispersed, and treating such dispersion with a sufficient quantity of sulphuric acid to decompose and precipitate its monosulphite and bisulphite salts content.

32. The process of claim 31 in which the dispersion is thoroughly cooled before adding sulphuric acid thereto.

33. The process of claim 31 in which a sufficient amount of sulphuric acid is added to bring the pH value of the final dispersion product to approximately 3.0 to 4.0 after removal of substantially all of the free sulphurous acid which may be present.

34. An aqueous dispersion containing a salt of lignin-sulphonic acid produced from solid phase lignin substance substantially free from associated or combined non-ligneous organic substances by heating with a bisulphite salt solution at not over 100° C. to establish conditions favorable to fixation of sulphonic groups (.SO₃H) to such lignin substance.

35. The dispersion of claim 34 substantially free from inorganic impurities.

36. The dispersion of claim 34 in which the base of the lignin-sulphonic acid salt is chromium.

37. The dispersion of claim 34 in which the base of the lignin-sulphonic acid salt is magnesium.

38. The dispersion of claim 34 which contains a plurality of salts of lignin-sulphonic acid.

39. An aqueous dispersion containing free lignin-sulphonic acid and a salt thereof and produced from solid phase lignin substance substantially free from associated or combined non-ligneous organic substances by heating with a bisulphite salt solution at not over 100° C. to establish conditions favorable to fixation of sulphonic groups (.SO₃H) to such lignin substance.

40. The dispersion of claim 39 substantially free from inorganic impurities.

41. The dispersion of claim 39 having a hydrogen ion concentration of the order pH=3.0 to 4.0.

42. The dispersion of claim 39 in which the base of the lignin-sulphonic acid salt is chromium.

43. The dispersion of claim 39 in which the base of the lignin-sulphonic acid salt is magesium.

44. The dispersion of claim 39 which contains a plurality of salts of lignin-sulphonic acid.

45. An aqueous dispersion of lignin substance for use as tanning material characterized in that substantially all of the dispersed lignin substance will fix to hide substance under commercial tanning operations and that the dispersion contains a salt of lignin-sulphonic acid produced from solid phase lignin substance substantially free from associated or combined non-ligneous organic substances by heating with a bisulphite salt solution at not over 100° C. to establish conditions favorable to fixation of sulphonic groups (.SO₃H) to such lignin substance.

46. An aqueous dispersion of lignin substance for use as tanning material characterized in that substantially all of the dispersed lignin substance will fix to hide substance under commercial tanning operations and that the dispersion contains free lignin-sulphonic acid and a salt thereof produced from solid phase lignin-substance substantially free from associated or combined non-ligneous organic substances by heating with a bisulphite salt solution at not over 100° C. to establish conditions favorable to fixation of sulphonic groups (.SO₃H) to such lignin substance.

47. The process of making aqueous dispersions of lignin substance which comprises treating solid lignin substance in lignin-sulphonic acid form and substantially free from the non-ligneous organic matter of waste sulphite liquor with an aqueous solution of a bisulphite substantially free from the non-ligneous organic matter of waste sulphite liquor.

48. An aqueous dispersion containing a salt of lignin-sulphonic acid produced by treating solid phase lignin substance in lignin-sulphonic acid form and substantially free from the non-ligneous organic matter of waste sulphite liquor with an aqueous solution of a bisulphite substantially free from the non-ligneous organic matter of waste sulphite liquor.

49. The dispersion of claim 48 in which the bisulphite used is calcium bisulphite.

GUY C. HOWARD.
CARLYLE HARMON.